July 16, 1946.                R. P. JETSCHMANN                2,404,177
                                   PASTRY
                            Filed March 5, 1942
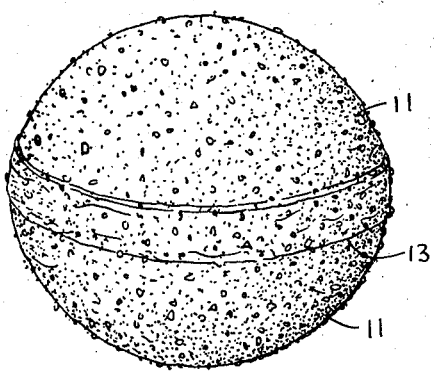
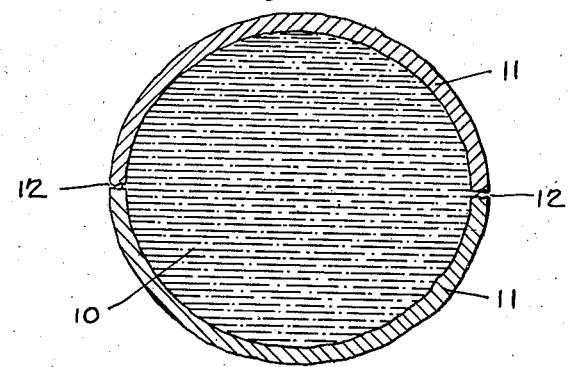
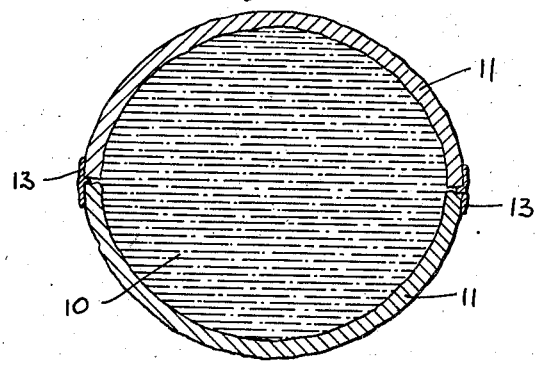
INVENTOR
Richard P. Jetschmann
BY
Johnson, Klines and Smyth
ATTORNEYS Patented July 16, 1946

2,404,177

UNITED STATES PATENT OFFICE 2,404,177

PASTRY

Richard P. Jetschmann, Milford, Conn.

Application March 5, 1942, Serial No. 433,411

4 Claims. (Cl. 99—137)

The present invention relates to pastries, and, more particularly, to a confection-filled pastry and the process for making the same.

The pastry comprises a center of confection having a thin-walled crust made from two substantially cup-shaped shells, preferably preformed by baking the same in suitably shaped molds.

The shells may be formed of any suitable batter or dough which will bake rapidly and which, when baked, will be crispy or flaky. I have found that the batter used to form patty shells makes an ideal batter for the shells used in the pastry of the present invention. Pastry shells made from such a batter are self-sustaining and may be stored for relatively long periods without deterioration.

The shells are filled with a confection which may consist of any confection desired, although preferably, the filling comprises a frozen confection such as ice cream, ice, sherbet, or frozen custard, and other products having similar characteristics. The confection need not be frozen, however, for various cream fillings may be used if desired.

The now preferred method of making the pastry herein disclosed consists of filling the shells with the confection, and then bringing the filled shells together so that the confection held by each shell forms a center enclosed by the shells. The shells are held against separation, and the line of jointure between the edges of the same is sealed by a strip of dough which may be made from the same batter as the shells themselves.

Where the pastry is filled with a frozen confection, it should be placed in a freezing compartment and allowed to remain there until the filling is frozen hard. If the filling is of a kind which is not frozen, it may be chilled either before or after it is placed in the shells.

After the two shells have been filled and placed together with the sealing strip of dough, the product is dropped in hot deep fat and fried until the sealing strip of dough is cooked and the outer surface of the shells is sufficiently browned. The fat should be so hot as to quickly cook the sealing strip of dough and brown the outer surface of the shells before the filling liquifies.

After the frying operation, the product may be dusted with confectionery sugar or the like.

The product should be immediately served as it is most delicious when the crust is hot and crisp, but if this is not possible, it should be placed in the freezing compartment immediately after cooking and kept there until wanted.

For some tastes, the product is improved by dipping the filled and joined shells in beaten eggs, and dusting it with flour or cracker or bread crumbs before it is fried.

In the drawing:

Figure 1 is a side elevational view of the completed pastry product of the present invention.

Fig. 2 is a sectional view showing the two shells in position about the filling.

Fig. 3 is a view similar to Fig. 2, showing the strip of dough sealing the adjacent edges of the two shells.

Referring now to the accompanying drawing, the pastry product of the present invention comprises a center or filling of confection 10 covered by a pair of substantially cup-shaped shells 11 formed from a suitable batter or dough. If desired, ornamental ridges or other decorative shapes may be formed on the outer surface of the shells by using suitable molds.

The shells are precooked or baked and may be made of batter in suitably shaped molds or in any other way from batter or dough. The extent to which they are cooked depends upon the materials used and personal taste, so long as they are quite permanently formed and sufficiently rigid to be handled and filled.

Preferably, the pastry or dough used to make the shells should be one which will bake rapidly, and which when baked will be crispy and flaky. I have found that the batter used to form the so-called patty shells makes a satisfactory batter for the shells 11. This batter when baked is self-sustaining and will retain its flaky characteristics for a relatively long period, and hence the shells may be stored for quite some time before they are used.

The filling 10 used in the shells may comprise any confection desired, although it has been found that a more delicious product is formed if the filling consists of a frozen confection such as ice cream, ice, sherbet, frozen custard, etc.

The pastry product may be formed by heaping a mass of the filling in one of the shells and covering it with the other, or two shells filled level with the confection may be brought together as shown in Fig. 2 of the drawing.

The line of jointure 12 between the abutting edges of the shells is sealed and the two shells secured together by a strip 13 of batter, such as is used to make the preformed shells or of any suitable dough. The product is then placed in a freezing compartment having a temperature considerably below the freezing temperature of the filling, and allowed to remain there until the confection is again frozen very hard, and left there until needed. When the finished product is to be made, the hard frozen filled pastry is taken from the freezer and immediately fried in deep fat until the strip 13 of dough is cooked, and the outer surfaces of the shells are browned sufficiently.

The fat should be quite hot so that the frying operation may be completed before the filling has had time to liquify. Usually, it is only necessary to leave the product in the hot fat for three or four seconds, and if a longer period seems necessary, the fat should be made hotter. If the pastry is allowed to remain in the fat for a time sufficient to liquify and then gasify the filling, the product may explode, the shells being blown apart by the expansion of gases within them.

After it has been fried, and before it is served, the product may be dusted with confectionery sugar if desired.

The product is most delicious when served immediately after being fried. However, if this is not practicable, it can be placed again in the freezing compartment until required.

A custard or a cream filling may be used instead of the ice cream, etc. Such soft fillings should be chilled before being placed in the shells, or the filled shells should be chilled just prior to frying.

The shells 11 need not be preformed, for if the dough is made stiff enough (such as pie crust) it will be sufficiently self-sustaining without baking to remain in place about the confection, until the pastry can be fried in the deep fat. Of course, if the shells are not preformed by first baking them, the filled shells must remain in the hot fat for a longer period of time. This necessitates freezing the filling to a very low temperature so it will not become liquified before the sealing strip is cooked.

A mixture of beaten eggs, cracker crumbs and flour may be used to coat the shells before they are fried in the deep fat. This may be done by either dipping the product or rolling the same in the egg mixture, and then in the crumbs.

Variations and modifications may be made within the scope of this invention and portions of the improvements may be used without others.

I claim:

1. A food product comprising a plurality of baked edible shell sections of pastry; a mass of frozen confection enclosed thereby; and a thin sealing strip of dough closing the adjacent edges of said pastry sections and holding them together, said dough and pastry sections being provided with a crisp, fried crust.

2. The process of producing a pastry which comprises the steps of forming a pair of hollow edible shells from a suitable batter, baking said shells, filling said shells with a frozen confection, superposing one shell on the other, sealing the line of jointure of said shells with a strip of dough, freezing and maintaining said product frozen hard and then submerging the filled shells in deep hot fat for sufficient time to cook said strip of dough and brown the outer surfaces of said shells without melting said confection.

3. The process of making a food product which comprises forming a pair of substantially cup-shaped baked edible pastry shells, placing a ball of ice cream between said shells, sealing the abutting edges of said shells with a strip of dough, freezing the product hard, and frying the product in deep hot fat until the strip of dough is crisp and the outer surfaces of said shells are browned.

4. The process of making a food product which comprises forming a pair of substantially cup-shaped baked edible pastry shells, placing a ball of ice cream between said shells, sealing the abutting edges of said shells with a strip of dough, freezing the product hard, frying the product in deep hot fat until the strip of dough is crisp and the outer surfaces of said shells are browned, refreezing the completed product, and storing in frozen condition until ready to use.

RICHARD P. JETSCHMANN.